(12) United States Patent
Finkelshtain et al.

(10) Patent No.: US 9,966,609 B2
(45) Date of Patent: May 8, 2018

(54) GAS DIFFUSION ELECTRODE AND PROCESS FOR MAKING SAME

(71) Applicant: GENCELL LTD., Petah Tikva (IL)

(72) Inventors: Gennadi Finkelshtain, Modiin (IL); Konstantin Petrov, Sofia (BG); Nino Borchtchoukova, Modiin (IL); Yevgeniya Pashkevich, Ramat-Gan (IL)

(73) Assignee: GENCELL LTD., Petah Tikva (IL)

( * ) Notice: Subject to any disclaimer, the term of this patent is extended or adjusted under 35 U.S.C. 154(b) by 103 days.

(21) Appl. No.: 14/898,707

(22) PCT Filed: Jun. 19, 2014

(86) PCT No.: PCT/US2014/043248
§ 371 (c)(1),
(2) Date: Dec. 15, 2015

(87) PCT Pub. No.: WO2014/205259
PCT Pub. Date: Dec. 24, 2014

(65) Prior Publication Data
US 2016/0141629 A1    May 19, 2016

Related U.S. Application Data

(60) Provisional application No. 61/837,319, filed on Jun. 20, 2013.

(51) Int. Cl.
*H01M 8/1004* (2016.01)
*H01M 4/86* (2006.01)
*H01M 8/083* (2016.01)
*H01M 4/88* (2006.01)
(Continued)

(52) U.S. Cl.
CPC .......... *H01M 4/86* (2013.01); *H01M 4/8807* (2013.01); *H01M 4/8896* (2013.01); *H01M 8/023* (2013.01); *H01M 8/0234* (2013.01); *H01M 8/083* (2013.01); *H01M 4/8668* (2013.01); *H01M 4/8673* (2013.01); *Y02P 70/56* (2015.11)

(58) Field of Classification Search
CPC .......................... H01M 8/1004; H01M 4/8807
See application file for complete search history.

(56) References Cited

U.S. PATENT DOCUMENTS 3,537,906 A   11/1970   Sindorf
4,031,033 A    6/1977   Budevski et al.
4,179,359 A   12/1979   Hayes et al.
(Continued)

FOREIGN PATENT DOCUMENTS

EP    0791974 A1    8/1997
EP    0928036 A1    7/1999
WO    03107359 A1   12/2003

*Primary Examiner* — Olatunji Godo
(74) *Attorney, Agent, or Firm* — Abel Law Group, LLP

(57) ABSTRACT

Disclosed is a process for making a gas diffusion electrode that comprises an electrically conductive substrate, a gas diffusion layer (GDL) and an active layer (AL). The process comprises forming the GDL and/or the AL by pressing and/or rolling a mass obtained by subjecting electrically conductive carbon material and polymeric binder and, in the case of the AL, electroactive catalyst to high energy mixing in a liquid medium, followed by the separation of solid matter from the liquid medium and, optionally, drying of the separated solid matter.

20 Claims, 4 Drawing Sheets

(51) Int. Cl.
*H01M 8/023* (2016.01)
*H01M 8/0234* (2016.01)

(56) References Cited

U.S. PATENT DOCUMENTS

| | | |
|---|---|---|
| 4,447,505 A | 5/1984 | Blanchart |
| 5,110,693 A | 5/1992 | Friend et al. |
| 5,480,735 A | 1/1996 | Landsman et al. |
| 5,630,868 A * | 5/1997 | Belmont .................. C09C 1/46 |
| | | 106/31.28 |
| 5,865,968 A | 2/1999 | Denton et al. |
| 6,368,476 B1 | 4/2002 | Demarinis et al. |
| 7,014,944 B2 | 3/2006 | Kordesch et al. |
| 2001/0036570 A1 * | 11/2001 | Tosco .................. H01M 4/8605 |
| | | 429/530 |
| 2003/0134178 A1 | 7/2003 | James |
| 2003/0134179 A1 | 7/2003 | Gascoyne et al. |
| 2003/0319051 | 10/2003 | Kordesch et al. |
| 2005/0201918 A1 | 9/2005 | Gordon et al. |
| 2005/0153235 A1 | 10/2005 | Ma et al. |
| 2006/0078784 A1 | 4/2006 | Liu et al. |
| 2009/0214765 A1 | 8/2009 | Gascoyne et al. |
| 2011/0039189 A1 | 2/2011 | Tanuma |

\* cited by examiner

GAS DIFFUSION ELECTRODE AND PROCESS FOR MAKING SAME

CROSS-REFERENCE TO RELATED APPLICATIONS

The present application claims priority of U.S. Provisional Patent Application No. 61/837,319, filed Jun. 20, 2013, the entire disclosure of which is expressly incorporated by reference herein.

BACKGROUND OF THE INVENTION

1. Field of the Invention

The present invention relates to a process for making a gas diffusion electrode for use in, e.g., an alkaline fuel cell and to a process for making the gas diffusion electrode.

2. Discussion of Background Information

An alkaline fuel cell (AFC) is an energy conversion device that converts the stored chemical energy of its fuel into electrical energy. Usually it uses hydrogen gas and oxygen gas to generate electrical power. The hydrogen is oxidized at the anode and oxygen (usually in the form of air) is reduced at the cathode. The product of the overall reaction is water.

AFCs were first employed by NASA for Apollo missions. Recently, Proton Exchange Membrane (PEM) fuel cells have found greater commercialization for a variety of reasons. However, the market is once again turning to AFCs because of several specific advantages. The advantages and disadvantages of AFCs are associated mainly with the use of an alkaline electrolyte, usually 7 M KOH or NaOH. With respect to advantages involved, circulating KOH helps to maintain the temperature and water balance and allows a simple design of the fuel cell. Further, the rate of electrochemical reactions in alkaline media is much higher than in acidic media (PEM), which makes it possible to use non-noble metal catalysts. Also, alkaline electrolyte permits broader operating temperatures than those of PEM fuel cells. AFCs can be operated over a wide temperature range, at temperatures as low as $-10°$ C. and as high as $+80°$ C. The construction of an AFC allows the liquid alkaline electrolyte to leave the cell after being shut down, and the overall lifetime of the electrodes is much higher than in the case of PEM fuel cells because corrosion occurs mainly when the cell is left at open circuit without load. Accordingly, the predicted service life of an alkaline fuel cell electrode is about 4000 hours. A disadvantage of an AFC is that the alkaline solution reacts with $CO_2$ from air and forms carbonates, thereby plugging the pores of the electrode and decreasing the ionic conductivity of the electrolyte.

Fuel cells comprise a solid or liquid electrolyte and two electrodes, an anode and a cathode, at which the desired electrochemical reactions take place. Both electrodes are of the special porous type, called gas diffusion electrode (GDE). A GDE is in contact with reactant gas (e.g., hydrogen or oxygen (air)) at one side and with solid or liquid electrolyte at the other side. The electrolyte is in contact with both electrodes. The GDE allows the reactant gas to enter the electrode from the side of the electrode that is exposed to the gas supply, and to diffuse through the electrode to the reaction sites which contain catalyst for accelerating the electrochemical oxidation of hydrogen and reduction of oxygen. GDEs are usually double-layered, with a gas diffusion layer (GDL) that is to come into contact with reactant gas and an active layer (AL) that is to come into contact with the electrolyte. The GDL is designed to supply gas to the AL and at the same time to prevent the electrolyte from leaking through it.

There are two main mechanisms for gas transport in porous media, i.e., Fick diffusion and Knudsen diffusion. Fick diffusion (molecular or transport diffusion) occurs when the mean free path is relatively short compared to the pore size. It is applicable to Brownian motion, where the movement of each molecule is random and not dependent on its previous motion. Knudsen diffusion occurs when the mean free path is relatively long compared to the pore size, so the gas molecules collide frequently with the pore wall. Knudsen diffusion is dominant for pores having diameters between 2 and 50 nm and ensures a higher rate of gas supply to the AL than Fick diffusion.

The AL of a GDE is designed to optimize the contact between reactant gas, electrolyte and catalyst in a so-called three-phase boundary (solid-liquid-gas in the case of liquid electrolyte) to maximize the reaction rate. Catalysts are incorporated into AL structures to increase the rates of the desired reactions. Catalysts are often precious metals, particularly platinum or alloys thereof in a very high surface area form, dispersed and supported on high surface area electrically conducting porous carbon black or graphite (see, for example U.S. Pat. No. 4,447,505, the entire disclosure of which is incorporated by reference herein). The catalyst component may also comprise a non-precious metal, such as one of the transition metals. In fuel cells containing alkaline electrolytes the cathode may comprise catalysts based on, e.g., macrocyclic compounds of cobalt (see, for example U.S. Pat. No. 4,179,359, the entire disclosure of which is incorporated by reference herein). The ALs also comprise non-catalytic components in addition to the catalyst material, usually polymeric materials which act as binders to hold the layer together and may also have the additional function of adjusting the hydrophobic/hydrophilic balance of the final structure.

The hydrophobic binder, frequently polytetrafluoroethylene (PTFE), commercially known as Teflon®, is employed mainly in two forms, i.e., as a dry powder or as a suspension. One of the best ways is the preparation of a material called teflonized carbon black. This is done by mixing carbon black and a PTFE suspension. As a result a highly hydrophobic material with a high rate of gas diffusion is obtained. This material is described in, for example, U.S. Pat. Nos. 3,537,906 and 4,031,033, the entire disclosures of which are incorporated by reference herein, and has been used for the preparation of GDLs and as addition to ALs of GDEs.

Major problems with conventional GDEs relate to the prevention of leaking of a GDL and to keeping stable the three-phase boundary in an AL (see, e.g., U.S. Pat. Nos. 7,014,944 and 5,480,735, the entire disclosures of which are incorporated by reference herein). GDLs consist essentially of hydrophobized carbon materials such as carbon blacks. The leaking of electrolyte through the GDL is prevented by using hydrophobic material, such as PTFE, which also serves as binding agent. There is a relationship between the thickness and the hydrophobicity of a GDL—the lower the concentration of the hydrophobic material the thicker the GDL must be in order to prevent leaking A thicker GDL on the other hand, means a lower rate of gas supply to the AL. The stability of the three-phase boundary in the AL also depends on conflicting parameters: a higher concentration of hydrophobic binder will keep the pores dry to thereby ensure a sufficient supply of reactant gas, but it will also increase the thickness of the AL, thereby increasing the transport hindrances of reaction products in the liquid phase.

Thin layered GDEs are desirable also in order to provide a sufficient flexibility thereof. Lack of flexibility makes GDEs easily damaged on handling which leads to high reject rates during manufacturing of the electrode. This obviously has an impact on production costs.

In view of the foregoing facts one has to find the right balance of the electrode materials in order to achieve the best performance of the electrodes both from an electrical output and a mechanical stability point of view. Finding the best ratio of the materials for making electrodes is a major challenge in the development and production of any fuel cell, and of alkaline fuel cells in particular.

SUMMARY OF THE INVENTION

The present invention provides a process for making a gas diffusion electrode that comprises an electrically conductive substrate, a gas diffusion layer (GDL) comprising at least a first electrically conductive carbon material and a first polymeric binder, and an active layer (AL) comprising at least a second electrically conductive carbon material, a second polymeric binder, and an electroactive catalyst. The process comprises forming the GDL and/or the AL (preferably both the GDL and the AL) by pressing and/or rolling (i.e., making a sheet of) a mass that has been obtained by subjecting electrically conductive (particulate) carbon material and polymeric binder or electrically conductive (particulate) carbon material, polymeric binder, and electroactive catalyst to (preferably mechanical high energy) mixing in a liquid medium, followed by separation of the solid matter from the liquid medium and, optionally, drying the separated solid matter.

In one aspect of the process, the mixing may comprise high shear mixing.

In another aspect, the liquid medium may comprise water.

In yet another aspect, the weight ratio electrically conductive carbon material:polymeric binder may be from about 0.75:1 to about 5:1 and/or the weight ratio liquid medium:(electrically conductive carbon material+polymeric binder) may be from about 200:1 to about 20:1.

In a still further aspect of the process of the present invention, the mixing (e.g., high shear mixing) may be carried out for a period of at least about 10 minutes.

In another aspect, the electrically conductive carbon material may be subjected to (high energy) mixing in at least a part of the liquid medium for a first period of time to reduce the average particle size of the carbon material, and may thereafter be combined with the polymeric binder (and optionally, electroactive catalyst) and subjected to high energy mixing for a second period of time.

In another aspect, the (high energy) mixing may result in a reduction of the average particle size of the electrically conductive carbon material, e.g., in an increased percentage of particles of electrically conductive carbon material having a size of less than 1 μm.

In yet another aspect of the process, the first electrically conductive carbon material and/or the second electrically conductive carbon material may have a BET surface area of at least about 250 m²/g and/or may comprise carbon black.

In another aspect, the first polymeric binder may be a hydrophobic material and may, for example, comprise PTFE. In yet another aspect, the second polymeric binder may comprise a hydrophobic material such as PTFE. For example, the first and second polymeric binders may be identical.

In another aspect, the process of the present invention may further comprise arranging the electrically conductive substrate (for example, in the form of a mesh) on the side of the GDL that is opposite to the side that is in contact with the AL. The electrically conductive substrate may at least partially be embedded in the GDL.

The present invention also provides a GDL that is obtainable by the process of the present invention as set forth above (including the various aspects thereof).

In one aspect, the GDL may have an average pore size of from about 7 nm to about 9 nm.

In another aspect, the GDL may have a thickness of not higher than about 0.75 mm and/or the combined thickness of GDL and AL may not be higher than about 0.85 mm.

The present invention also provides a fuel cell and in particular, an alkaline fuel cell that comprises the gas diffusion electrode of the present invention as set forth above (including the various aspects thereof) as an anode and/or a cathode, as well as a method of generating electric energy that comprises feeding hydrogen and oxygen to this fuel cell and applying a load thereto.

BRIEF DESCRIPTION OF THE DRAWINGS

The present invention is further described in the detailed description which follows, in reference to the noted plurality of drawings by way of non-limiting examples of exemplary embodiments of the present invention, wherein.

DETAILED DESCRIPTION OF THE PRESENT INVENTION

Figure 1:
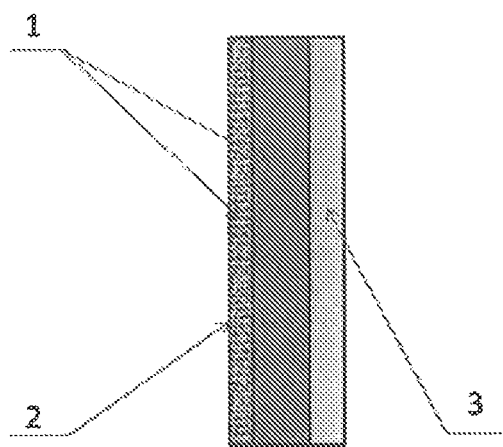
FIG. 1 shows a schematic diagram of a structure of gas diffusion electrode of the present invention. (Gas diffusion layer—1; current collector incorporated in gas diffusion layer—2; active layer—3).

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

As set forth above, the present invention provides a process for making a gas diffusion electrode that comprises an electrically conductive substrate, a GDL comprising (e.g., consisting essentially of) at least a first electrically conductive carbon material and a first polymeric (and usually hydrophobic) binder, and an AL comprising (e.g., consisting essentially of) at least a second electrically conductive carbon material, a second polymeric binder, and an electroactive catalyst. The process comprises forming the GDL and/or the AL (e.g., both the GDL and the AL) by pressing and/or rolling (i.e., making a sheet of) a mass that has been obtained by subjecting electrically conductive carbon material and polymeric binder or electrically conductive carbon material, polymeric binder, and electroactive catalyst to (high energy) mixing in a liquid (often aqueous) medium, followed by a separation of the solid matter from the liquid medium (e.g., by filtration or centrifugation) and, optionally, drying of the separated solid matter (e.g., a resultant filter cake).

A preferred embodiment of mixing in the process of the present invention is high shear mixing in a liquid medium such as water, for example with a commercially available or self-made high shear mixer. High shear mixers are commercially available from several companies, for example, from Charles Ross & Son Company of Hauppage N.Y. An example of a high shear mixer that is available from this company and suitable for use in the process of the present invention is Model 100LCI. High shear mixers frequently feature rotation speeds of at least 500 rpm (and up to 10,000 rpm or even higher). The rotors and stator heads of high shear mixers can have many different designs that are adapted to specific applications and materials to be mixed.

High shear mixing in a liquid medium, conducted for a sufficient period of time, results in an intimate mixture of the solid or at least non-liquid materials subjected to high shear mixing. In the case of the instant invention, it results in an intimate and homogeneous contact between the polymeric binder (e.g., PTFE) and carbon particles, producing carbon particles with polymeric binder uniformly spread thereon. High shear mixing usually will also reduce the particle size of solid materials such as the electrically conductive carbon material used in the present invention. In this regard, it is preferred for the carbon material, e.g., carbon black, used in the process of the present invention (before being combined in the liquid medium with the polymeric binder) to have such a particle size distribution that it comprises a significant percentage of particles having a particle size of less than 1 µm, for example, at least about 30 vol. %, at least about 35 vol. %, at least about 40 vol. %, at least about 45 vol. %, or even at least about 50 vol. %, and/or that it comprises a significant percentage of particles having a particle size of less than 0.5 µm, for example, at least about 25 vol. %, at least about 30 vol. %, at least about 35 vol. %, at least about 40 vol. %, or even at least about 45 vol. %, and/or that it comprises a significant percentage of particles having a particle size of less than 0.3 µm, for example, at least about 15 vol. %, at least about 20 vol. %, at least about 25 vol. %, at least about 30 vol. %, or even at least about 35 vol. %. By way of non-limiting example, the carbon material used as starting material in the process of the present invention may have a particle size distribution which comprises least about 30 vol. % of particles having a particle size of less than 1 µm, at least about 25 vol. % of particles having a particle size of less than 0.5 µm, and at least about 15 vol. % of particles having a particle size of less than 0.3 µm, e.g., a particle size distribution which comprises least about 35 vol. % of particles having a particle size of less than 1 µm, at least about 30 vol. % of particles having a particle size of less than 0.5 µm, and at least about 20 vol. % of particles having a particle size of less than 0.3 µm, a particle size distribution which comprises least about 40 vol. % of particles having a particle size of less than 1 µm, at least about 30 vol. % of particles having a particle size of less than 0.5 µm, and at least about 20 vol. % of particles having a particle size of less than 0.3 µm, or a particle size distribution which comprises least about 45 vol. % of particles having a particle size of less than 1 µm, at least about 35 vol. % of particles having a particle size of less than 0.5 µm, and at least about 25 vol. % of particles having a particle size of less than 0.3 µm. If the percentage of carbon particles of a certain size range is not as desired the particle size can be reduced by, for example, subjecting the carbon material to high shear mixing in the absence of polymeric binder, i.e., by adding the polymeric binder only after the desired particle size or particle size distribution of the carbon particles has been achieved. Additionally, the starting electrically conductive carbon material will preferably comprise not more than about 0.5 vol. %, e.g., not more than about 0.1 vol. % of particles having a size of more than 100 µm. It further is preferred for the starting electrically conductive carbon material to comprise not more than about 5 vol. %, e.g., not more than about 3 vol. % of particles having a size of more than 10 µm.

The above particle size percentages are determined by the particle size analyzer "Mastersizer 2000", commercially available from Malvern Instruments, Malvern, Worcestershire, UK.

The liquid medium for the (e.g., high shear) mixing in the process of the present invention will frequently be water. However, other liquids such as, for example, organic solvents which do not dissolve the polymeric binder to any significant extent may also be used, optionally in combination with water. Non-limiting examples of suitable (preferably polar) protic or aprotic organic solvents include alkanols such as isopropanol, ethanol, and methanol, ketones such as acetone and butanone, and esters such as ethyl acetate.

The weight ratio electrically conductive carbon material: one or more polymeric binders in the GDL will usually be at least about 0.75:1, e.g., at least about 1:1, and will usually be not higher than about 5:1, e.g., not higher than about 2.5:1. The weight ratio electrically conductive carbon material:one or more polymeric binders in the AL will usually be at least about 1:1, e.g., at least about 2:1, and will usually not be higher than about 5:1, e.g., not higher than about 4:1. This weight ratio excludes the carbon that may be present as electroactive catalyst or support for an electroactive (metal) catalyst in the AL.

The weight ratio liquid medium:(electrically conductive carbon material+polymeric binder) will usually not be higher than about 200:1, e.g., not higher than about 150:1, or not higher than about 100:1 and will usually not be lower than to about 20:1, e.g., not lower than about 50:1, or not lower than about 75:1. This weight ratio excludes the carbon that may be present as electroactive catalyst or support of an electroactive (metal) catalyst in the AL.

The (high energy and in particular, high shear) mixing of electrically conductive carbon material and polymeric binder will usually be carried out for a period of at least about 10 minutes, e.g., at least about 20 minutes, at least about 25 minutes, or at least about 30 minutes, at rotation speeds in a high shear mixer of at least about 500 rpm, e.g., at least about 1,000 rpm, at least about 1,500 rpm, or at least about 2,000 rpm (depending upon, inter alia, the design of the high shear mixer and the materials employed). In the case of the mass for the AL it may be advantageous to pre-mix the electrically conductive carbon material and the catalyst (e.g., catalytically active carbon or carbon-supported metal catalyst) before combining the resultant mixture with the polymeric binder. In this case mixing times of at least about 10 minutes, e.g., at least about 15 minutes, or at least about 20 minutes, at rotation speeds in a high shear mixer of at least about 4,000 rpm, e.g., at least about 6,000 rpm, or at least about 8,000 rpm (depending upon, inter alia, the design of the high shear mixer and the materials employed) may often advantageously be employed.

Figure 2A:
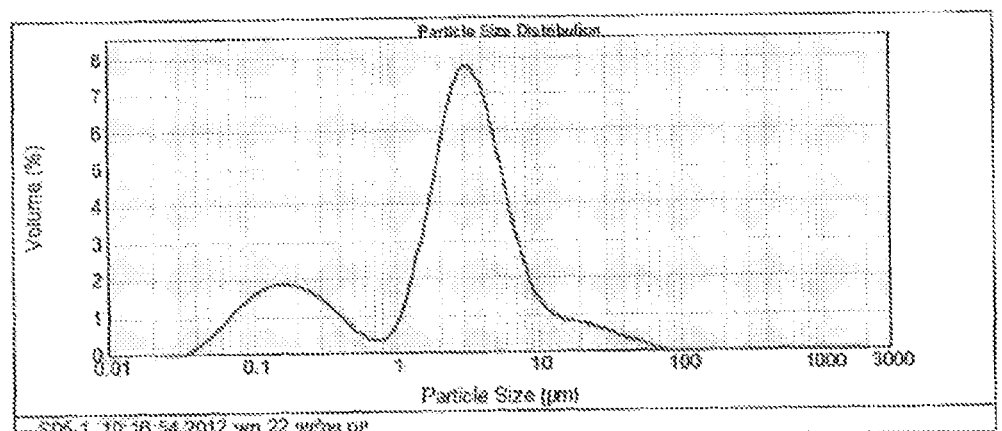
FIG. 2a and FIG. 2b show the particle size distribution of a carbon black before and after treatment in an aqueous medium in a high shear mixer.
Figure 2B:
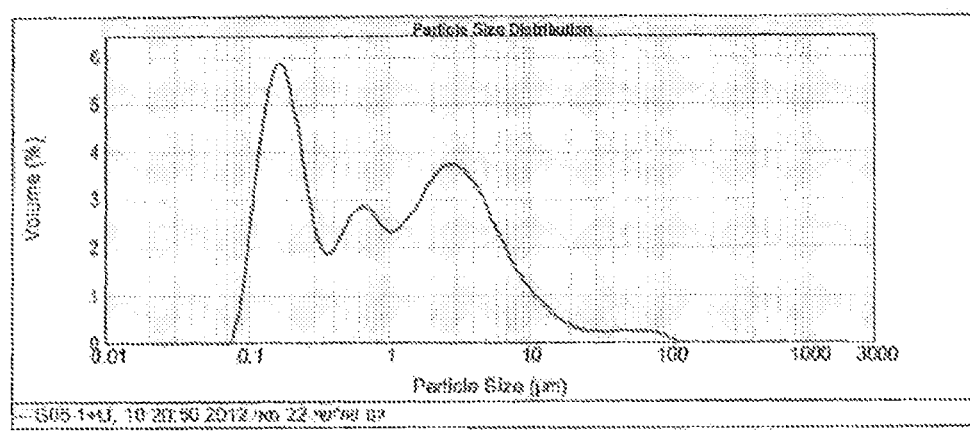

Depending upon the electrically conductive carbon material employed, it may further be advantageous to pre-disperse the carbon material in the liquid medium and to break up agglomerates and optionally, reduce the particle size before adding the polymeric binder (or the catalyst and the polymeric binder in the case of the mass for the AL). In this case, a suitable (pre)mixing time in a high shear mixer will often be at least about 5 minutes, e.g., at least about 10 minutes, or at least about 20 minutes, at rotation speeds in a high shear mixer of at least about 4,000 rpm, e.g., at least about 6,000 rpm, or at least about 8,000 rpm. FIG. 2a and FIG. 2b illustrate particle size distributions of a carbon black material (Vulcan XC-72R from Cabot) before and after treatment in a high shear mixer at room temperature (treatment time: 20 min; rotation speed: 6000 rpm; liquid medium:water/ethanol (weight ratio 200/1); weight ratio liquid medium:carbon black: 60:1)

The electrically conductive carbon material employed in the GDL (and also in the AL) can be amorphous or crystalline and preferably is or comprises a carbon black such as furnace black or acetylene black. The electrically conductive carbon material preferably has a BET surface area of at least about 250 $m^2/g$, and usually not higher than about 1500 $m^2/g$. Corresponding materials are commercially available. A non-limiting example of a commercially available material is carbon black Vulcan XC-72R from Cabot.

The mixing temperatures in the process of the present invention will usually be ambient temperatures (from about 20° C. to about 30° C.), although lower and higher temperatures may be used as well, as long as the temperature does not exceed the boiling point of the liquid medium employed. The mixing will usually carried out in an open container under ambient pressure, although higher and lower pressures may be used as well.

The polymeric binder for use in the GDL of the GDE of the present invention will usually be hydrophobic and may, for example, be selected from hydrophobic polymers such as fluorinated polymers (e.g., PTFE, polyhexafluoropropylene, polychlorofluoroethylene, polyvinylidene fluoride, and fluorinated ethylene-propylene copolymers), polyvinyl chloride, polyethylene, polypropylene, ethylene-propylene copolymers, polyisobutenes, and combinations of two or more thereof. A preferred polymeric binder for use in the GDL is PTFE.

The polymeric binder for use in the AL may be hydrophobic and may, for example, be selected from hydrophobic polymers such as fluorinated polymers (e.g., PTFE, polyhexafluoropropylene, polychlorofluoroethylene, polyvinylidene fluoride, and fluorinated ethylene-propylene copolymers), polyvinyl chloride, polyethylene, polypropylene, ethylene-propylene copolymers, polyisobutenes, and combinations of two or more thereof. A preferred polymeric binder for use in the AL is PTFE. Depending on the hydrophobicity of the catalyst employed, the polymeric binder for the AL may also be a mixture of one or more hydrophobic polymers and one or more hydrophilic polymers to adjust the hydrophilic/hydrophobic balance of the AL to an appropriate value (to provide a sufficiently stable three-phase boundary). Non-limiting examples of suitable hydrophilic polymers for this purpose include polysulfones, perfluorosulfonate ionomers, and epoxy resins.

The binders for in particular, the AL of the GDE of the present invention may be selected for use in combination that assures the proper hydrophobic/hydrophilic balance of the electrode, which provides the optimum ionic conduction pathways in the electrode. An additional advantage of this method is that the incorporation of polymeric materials into the structure can be carefully controlled. This provides the ability to tailor the hydrophobic/hydrophilic nature of the matrix to give improved performance characteristics.

It is advantageous to use the same hydrophobic polymeric binder and the same electrically conductive carbon material (but possibly in different weight ratios) for the production of the GDL and the AL of the GDE of the present invention. This ensures a particularly good adhesion between the AL and the GDL. It also is preferred to produce both the GDL and the AL from a mass that has been obtained by high energy (in particular, high shear) mixing of the constituents in a liquid medium.

The electroactive catalyst for use in the AL of the GDE of the present invention may be selected from, e.g., the catalysts which are known to be suitable for use in a GDE. Non-limiting examples thereof include noble metal catalysts such as Pt, Pd, Ag, and alloys thereof (optionally supported on, e.g., carbon particles) and non-noble metal catalysts such as, e.g., spinels, perovskites, and macrocylic compounds such as Co-porphyrines, cobalt and iron phthalocyanines, tetra-aza annulene complexes, and tetraphenylporphyrine complexes of Co and Fe (optionally supported on, e.g., carbon particles).

Due to the high degree of hydrophobicity and the dry conditions in the GDL of the GDE of the present invention the electrically conductive substrate (current collector) may be placed on the gas side of the GDE, as is shown in FIG. 1. In FIG. 1 the numeral 1 indicates the GDL (with current collector 2 embedded therein in a part thereof) and the numeral 3 indicates the AL. The conductive substrate may be selected from, e.g., the electrically conductive support structure that are known for this purpose and may, for example, be selected from, but not limited to, an electrically conductive mesh, a grid, a metal foam, an expanded metal, and any combinations thereof. A preferred electrically conductive substrate for use in the GDE of the present invention is an electrically conductive mesh having about 40 wires per inch horizontally and about 20 wires per inch vertically, although other mesh structures may work equally well. The wires constituting the mesh may have a diameter of from about 0.005 inches to about 0.01 inches, preferably from 0.005 inches to 0.008 inches. This design provides optimal current distribution due to the reduction of the ohmic resistance. If more than 20 vertical wires per inch are present, problems may be encountered when affixing the GDL material to the electrically conductive substrate. The electrically conductive substrate may be made of any electrically conductive material and is preferably made of a metallic material such as pure metal or a metal alloy. For example, if the GDL assures sufficiently dry conditions (keeping liquid electrolyte from reaching the gas side of the GDL) inexpensive materials such as copper gauze covered by Pb or conductive organics may be used.

The GDL of the GDE obtained by the process of the present invention preferably has an average pore size of from about 7 nm to about 9 nm and thus makes it possible to achieve more than about 50% of Knudsen diffusion.

The GDL preferably has a thickness of not more than about 0.75 mm, e.g., from about 0.3 mm to about 0.7 mm. In combination with the pore size this provides a high rate of gas supply to the AL and makes the GDL stable enough against leaking of electrolyte.

The AL of the GDE obtained by the process of the present invention preferably has a thickness of not more than about 0.3 mm, e.g., a thickness of from about 0.05 mm to about 0.1 mm. Due to the obtained intimate and homogeneous contact between catalytic particles and binder if the process of the present invention is used for producing the AL of the GDE, a lower amount of binder is needed and a thinner AL can be achieved, ensuring a high gas diffusion rate, high electronic conductivity and good ion transport in the liquid phase.

The total thickness of the GDE of the present invention preferably is not higher than about 0.85 mm, and may be as low as about 0.5 mm. A further advantage of this GDE is improved performance due to reduced mass transport losses.

The specific catalyst density of a GDE of the present invention usually will be from about 0.8 mg/cm$^3$ to about 50 mg/cm$^3$ or from about 0.1 mg/cm$^2$ to about 20 mg/cm$^2$, and the overall density of the GDE usually will be from about 50 mg/cm$^2$ to about 150 mg/cm$^2$.

The GDE of the present invention may be made by procedures that are well known to those of skill in the art. For example, the mass for the GDL may be spread on the electrically conductive substrate (current collector). This may be done by wet or dry technology, such as printing, rolling, K-bar or doctor blade methods or by spraying, etc. The same applies to the deposition of the mass for the AL on the GDL. Thereby the basic structure of a GDE, as shown in FIG. 1, is obtained. After the preparation of both layers the final step may include rolling and/or pressing of the entire structure, preferably at an elevated temperature up to about 320° C.

A major advantage of the process of the present invention is that a dimensionally stable and highly flexible GDE can be obtained. The incidence of damage to the electrode on handling during manufacture is therefore minimized, thereby reducing the number of faulty or rejected electrodes, and consequently the manufacturing costs. Furthermore, compared to carbon paper or woven cloths the intrinsic material cost is significantly reduced. In addition, the electrode of the present invention is more amenable to high volume continuous production processes due to its high dimensional stability.

GDEs of the present invention are suitable for low cost manufacture. They may be prepared by every known wet or dry technology, such as printing, rolling, K-bar or doctor blade methods or spraying, etc., as well as by continuous manufacturing processes, for example paper-making, calendaring or extrusion.

To sum up, the present invention provides:

1. A process for making a gas diffusion electrode that comprises an electrically conductive substrate, a gas diffusion layer (GDL) and an active layer (AL), the GDL comprising at least a first electrically conductive carbon material and a first polymeric binder and the AL comprising at least a second electrically conductive carbon material, a second polymeric binder, and electroactive catalyst, wherein the process comprises forming at least one of the GDL and the AL by at least one of pressing and rolling a mass obtained by subjecting electrically conductive carbon material and polymeric binder or electrically conductive carbon material, polymeric binder, and electroactive catalyst to mixing in a liquid medium, followed by separation of solid matter from the liquid medium and, optionally, drying of separated solid matter.
2. The process of item 1, wherein the mixing comprises high shear mixing.
3. The process of any of items 1 and 2, wherein the liquid medium comprises water.
4. The process of any of items 1 to 3, wherein a weight ratio electrically conductive carbon material:polymeric binder is from about 0.75:1 to about 5:1.
5. The process of any of items 1 to 4, wherein a weight ratio liquid medium:(electrically conductive carbon material+polymeric binder) is from about 200:1 to about 20:1.
6. The process of any of items 1 to 5, wherein the mixing is carried out for a period of at least about 10 minutes.
7. The process of any of items 1 to 6, wherein the electrically conductive carbon material is subjected to mixing in at least a part of the liquid medium for a first period of time to reduce an average particle size of the electrically conductive carbon material and thereafter is combined with the polymeric binder and subjected to high energy mixing for a second period of time.
8. The process of any of items 1 to 7, wherein the mixing results in a reduction of an average particle size of the electrically conductive carbon material.
9. The process of any of items 1 to 8, wherein the mixing results in an increased percentage of particles of electrically conductive carbon material having a size of less than 1 μm.
10. The process of any of items 1 to 9, wherein at least one of the first electrically conductive carbon material and the second electrically conductive carbon material has a BET surface area of at least about 250 m$^2$/g.
11. The process of any of items 1 to 10, wherein at least one of the first electrically conductive carbon material and the second electrically conductive carbon material comprises carbon black.
12. The process of any of items 1 to 11, wherein the first polymeric binder is a hydrophobic material.
13. The process of any of items 1 to 12, wherein the first polymeric binder comprises polytetrafluoroethylene.
14. The process of any of items 1 to 13, wherein the second polymeric binder comprises polytetrafluoroethylene.
15. The process of any of items 1 to 14, wherein the first and second polymeric binders are identical.
16. The process of any of items 1 to 15, wherein the process further comprises arranging the electrically conductive substrate on a side of the GDL that is opposite to that of the AL.
17. The process of item 16, wherein the electrically conductive substrate is at least partially embedded in the GDL.
18. The process of any of items 16 and 17 wherein the electrically conductive substrate comprises a mesh.
19. The process of any of items 1 to 18, wherein both the GDL and the AL are formed from a mass obtained by mixing of electrically conductive carbon material, polymeric binder and, optionally, electroactive catalyst.
20. A gas diffusion electrode which is obtainable by the process of any of items 1 to 19.
21. The gas diffusion electrode of item 20, wherein the GDL has an average pore size of from about 7 nm to about 9 nm.
22. The gas diffusion electrode of any of items 20 and 21, wherein the GDL has a thickness of not higher than about 0.75 mm.
23. The gas diffusion electrode of any of items 20 to 22, wherein a combined thickness of GDL and AL is not higher than about 0.85 mm.
24. A fuel cell, wherein the fuel cell comprises the gas diffusion electrode of any of items 20 to 23 as at least one of an anode and a cathode.
25. The fuel cell of item 24, wherein the fuel cell is an alkaline fuel cell.
26. The fuel cell of any of items 24 and 25, wherein the fuel cell comprises the gas diffusion electrode at least as a cathode.

27. The fuel cell of any of items 24 and 25, wherein the fuel cell comprises the gas diffusion electrode at least as an anode.

28. A method of generating electric energy, wherein the method comprises feeding hydrogen and oxygen to the fuel cell of any of items 24 to 27 and applying a load.

The present invention is further illustrated by the following non-limiting examples.

In the Examples below, the performance of the fuel cell electrodes was assessed by measuring the potential (versus hydrogen electrode in the same solution) and the current density relationship in a half cell measuring unit using a standard operating procedure. Unless otherwise stated, these conditions were typically: temperature of electrolyte=70° C.; atmospheric gas pressure, and reactant stoichiometry of 1.5 to 2.5 for hydrogen and 2.0 to 3.0 for air.

Example 1

A GDE according to the present invention for use as a cathode in an AFC was prepared as follows. A mass for the production of the GDL was prepared by using a self-made high shear mixer (500-10,000 rpm) with a 40 L reservoir. First, 200 g of carbon black (Vulcan XC-72R) was suspended and ground in 34 L of deionized water inside the reservoir for about 20 minutes, using a mixer speed of 8,000 rpm. 317 g of PTFE suspension (63 wt. % PTFE, available from DuPont) was diluted with deionized water to a total volume of 2 L, added to the reservoir containing water and previously treated carbon black and thereafter was subjected to high shear mixing at a rotation speed of 2,000 rpm for 30 minutes, followed by filtration and drying at 90° C. for 4 hours. The obtained material (teflonized carbon black) was rolled at room temperature onto a current collector (Cu mesh covered by conductive organics) through a gap of 350-400 µm up to a thickness of 700±20 µm, thus preparing the GDL. The density of teflonized carbon black in the GDL was 60 mg/cm$^2$.

The mass for the production of the AL of the GDE was prepared by using the above high shear mixer with 40 L reservoir. First, 200 g of carbon black (Vulcan XC-72R) was suspended and ground in 34 L of deionized water inside the reservoir for about 20 minutes, using a mixer speed of 8,000 rpm. 200 g of catalyst (Ag/CoTMPP/carbon) was added to and suspended in the water+carbon mixture at 8,000 rpm for 20 minutes, followed by the addition of 70 g of PTFE suspension (63 wt. % PTFE, available from DuPont) that had been diluted with deionized water to a volume of 1 L, and subjecting the resultant mixture to high shear mixing for 30 minutes at 2,000 rpm. Following filtration and drying for 4 hours at 90° C., the produced catalytic mass was rolled at room temperature through a gap of 200±10 µm up to thickness of the AL of 300±10 µm. The density of the catalytic mass in the AL was 25 mg/cm$^2$.

Figure 3:
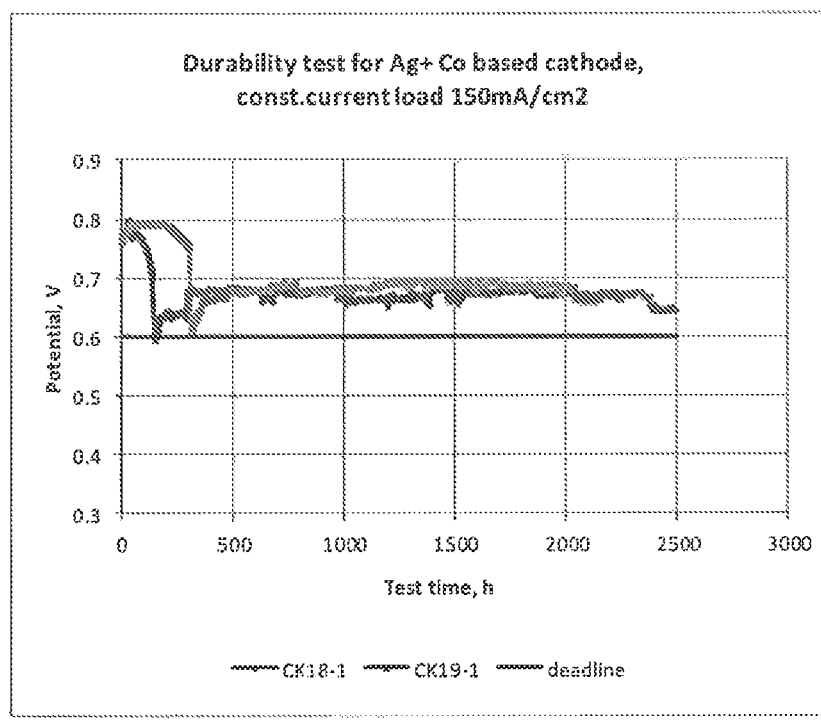
FIG. 3 is a diagram showing the potential over time of a GDE according to the present invention with an Ag/CoTMPP/carbon catalyst under a load of 150 mA/cm².

The GDL and AL prepared as described above were cut into pieces of desired size and then combined, with the AL on the side of the GDL opposite to that of the current collector. This sandwich structure was rolled consecutively through decreasing gaps from 900 µm down to 500±20 µm. The temperature of the rollers was 305±10° C. The final thickness of the GDE was 800±20 µm. The produced GDE showed very stable performance with a low overpotential, as illustrated in FIG. 3.

Example 2

Figure 4:
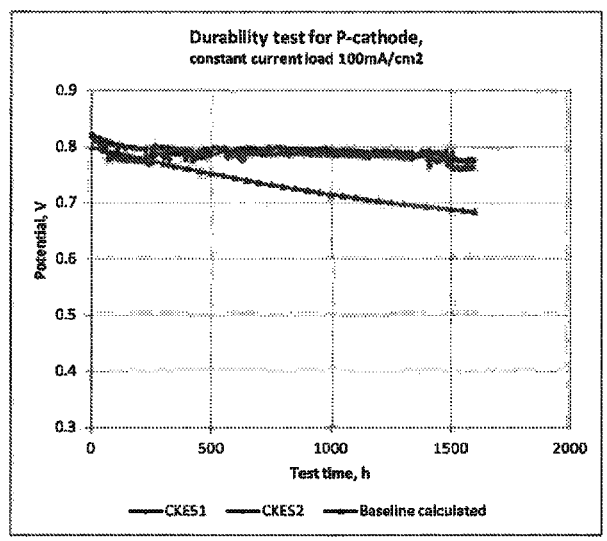
FIG. 4 is a diagram showing the potential over time of a GDE according to the present invention with a CoTMPP/carbon catalyst under a load of 100 mA/cm².

The GDE was prepared in the same way as described in Example 1, but replacing the catalyst by CoTMPP/carbon. The performance of the resultant electrode is graphically represented in FIG. 4.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A process for making a gas diffusion electrode that comprises an electrically conductive substrate, a gas diffusion layer (GDL) and an active layer (AL), the GDL comprising at least a first electrically conductive carbon material and a first polymeric binder and the AL comprising at least a second electrically conductive carbon material, a second polymeric binder, and electroactive catalyst, wherein the process comprises forming at least one of the GDL and the AL by at least one of pressing and rolling a mass obtained by subjecting electrically conductive carbon material and polymeric binder or electrically conductive carbon material, polymeric binder, and electroactive catalyst to mixing in a liquid medium, followed by separation of solid matter from the liquid medium and, optionally, drying of separated solid matter.

2. The process of claim 1, wherein the mixing comprises high shear mixing.

3. The process of claim 1, wherein the liquid medium comprises water.

4. The process of claim 1, wherein a weight ratio electrically conductive carbon material:polymeric binder is from about 0.75:1 to about 5:1.

5. The process of claim 1, wherein a weight ratio liquid medium:(electrically conductive carbon material+polymeric binder) is from about 200:1 to about 20:1.

6. The process of claim 1, wherein the mixing is carried out for a period of at least about 10 minutes.

7. The process of claim 1, wherein the electrically conductive carbon material is subjected to mixing in at least a part of the liquid medium for a first period of time to reduce an average particle size of the electrically conductive carbon material and thereafter is combined with the polymeric binder and subjected to high energy mixing for a second period of time.

8. The process of claim 1, wherein the mixing results in a reduction of an average particle size of the electrically conductive carbon material.

9. The process of claim 1, wherein the mixing results in an increased percentage of particles of electrically conductive carbon material having a size of less than 1 µm.

10. The process of claim 1, wherein at least one of the first electrically conductive carbon material and the second electrically conductive carbon material has a BET surface area of at least about 250 m$^2$/g.

11. The process of claim 1, wherein at least one of the first electrically conductive carbon material and the second electrically conductive carbon material comprises carbon black.

12. The process of claim 1, wherein the first polymeric binder is a hydrophobic material.

13. The process of claim 1, wherein the first polymeric binder comprises polytetrafluoroethylene.

14. The process of claim 1, wherein the second polymeric binder comprises polytetrafluoroethylene.

15. The process of claim 1, wherein the first and second polymeric binders are identical.

16. The process of claim 1, wherein the process further comprises arranging the electrically conductive substrate on a side of the GDL that is opposite to that of the AL.

17. The process of claim 1, wherein the electrically conductive substrate is at least partially embedded in the GDL.

18. A gas diffusion electrode which is obtainable by the process of claim 1.

19. A fuel cell, wherein the fuel cell comprises the gas diffusion electrode of claim 18.

20. A method of generating electric energy, wherein the method comprises feeding hydrogen and oxygen to the fuel cell of claim 19 and applying a load.

* * * * *